US009824197B2

(12) United States Patent
Liu et al.

(10) Patent No.: US 9,824,197 B2
(45) Date of Patent: Nov. 21, 2017

(54) CLASSIFIER TRAINING METHOD AND APPARATUS, IDENTITY AUTHENTICATION METHOD AND SYSTEM

(71) Applicant: Tencent Technology (Shenzhen) Company Limited, Shenzhen (CN)

(72) Inventors: Jie Liu, Shenzhen (CN); Kaiyuan Gu, Shenzhen (CN); Li Lu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 15/112,469

(22) PCT Filed: Jun. 3, 2015

(86) PCT No.: PCT/CN2015/080629
§ 371 (c)(1),
(2) Date: Jul. 19, 2016

(87) PCT Pub. No.: WO2015/184982
PCT Pub. Date: Dec. 10, 2015

(65) Prior Publication Data
US 2016/0335425 A1     Nov. 17, 2016

(30) Foreign Application Priority Data
Jun. 3, 2014 (CN) .......................... 2014 1 0242769

(51) Int. Cl.
*G06F 21/31* (2013.01)
*G06F 21/44* (2013.01)

(52) U.S. Cl.
CPC .............. *G06F 21/31* (2013.01); *G06F 21/44* (2013.01)

(58) Field of Classification Search
CPC .................................. G06F 21/31; G06F 21/44
(Continued)

(56) References Cited

U.S. PATENT DOCUMENTS

2003/0009467 A1* 1/2003 Perrizo ............ G06F 17/30961
2003/0101086 A1* 5/2003 San Miguel ..... G06Q 10/06311
705/7.13
(Continued)

FOREIGN PATENT DOCUMENTS

CN        102325062 A    1/2012
CN        103473231 A    12/2013
WO    WO 2013/054983 A1   4/2013

OTHER PUBLICATIONS

Sheng, Y., et al., "A parallel decision tree-based method for user authentication based on keystroke patterns," IEEE Transactions on Systems, Man and Cybernetics—Part B: Cybernetics, (Aug. 2005) 35(4): 836-833.*
(Continued)

*Primary Examiner* — Matthew Henning
(74) *Attorney, Agent, or Firm* — Bookoff McAndrews, PLLC

(57) ABSTRACT

Provided is a classifier training method, including: acquiring a training sample set; determining a classification condition at a root node according to a preset classification condition feature, performing classification on training samples in the training sample set according to the classification condition at the root node, and acquiring a classification subset corresponding to a child node of the root node; using the child node of the root node as a current node, circularly implementing the step of determining a classification condition at the current node according to another preset classification condition feature, performing classification on training samples in a classification subset corresponding to the current node according to the classification condition at the current node, and acquiring a classification subset of a child node of the current node, till a leaf node; and determining a (Continued)

user identity classification result at the current node, and obtaining a decision tree classifier.

12 Claims, 8 Drawing Sheets

(58) Field of Classification Search
USPC .......................................................... 726/17
See application file for complete search history.

(56) References Cited

U.S. PATENT DOCUMENTS

| 2007/0274293 A1* | 11/2007 | Forbes .................... H04L 63/08 370/352 |
| 2013/0091541 A1* | 4/2013 | Beskrovny .......... G06F 11/3688 726/1 |
| 2013/0163808 A1* | 6/2013 | Clements ................. G09C 5/00 382/100 |

OTHER PUBLICATIONS

International Search Report issued in corresponding International Application No. PCT/CN2015/080629, dated Sep. 2, 2015 (2 pages).

Written Opinion of the International Searching Authority issued in corresponding International Application No. PCT/CN2015/080629, dated Sep. 2, 2015 (4 pages).

* cited by examiner

CLASSIFIER TRAINING METHOD AND APPARATUS, IDENTITY AUTHENTICATION METHOD AND SYSTEM

CROSS-REFERENCE TO RELATED APPLICATIONS

This application is the U.S. National Phase application under 35 U.S.C. 371 of International Application PCT/CN2015/080629, filed Jun. 3, 2015, which claims the benefit of priority to Chinese Patent Application No. 201410242769.4, filed on Jun. 3, 2014, the entire contents of which, for each of the aforementioned applications, are hereby incorporated by reference.

FIELD OF THE TECHNOLOGY

The present disclosure relates to the field of computer security technologies, and in particular, to a classifier training method and apparatus, and an identity authentication method and system.

BACKGROUND OF THE DISCLOSURE

An account is a digital representation of a user on the Internet, and is an important reference for identifying different users. However, in some circumstances, a real owner of an account cannot use the own account, for example, the user may forget a password, or the account is stolen by a malicious user and the password is modified maliciously, or the like. In this case, it is needed to perform user identity authentication, so as to determine belonging of the account, and the password is modified according to the requirement of the user when it is determined that the user is the legal user of the account, such that the user has a control right of the account. This process generally may be referred to as account appeal.

Currently, during identity authentication on the user and account belonging determination accordingly, the user needs to submit evidences, and the evidences are generally proof information proving that the user used to have this account. Then, a server judges each piece of submitted evidence to see whether it is right or wrong, performs weighted scoring according to a judgment result, and finally determines, according to whether the score of the weighted scoring exceeds a score threshold, whether the user submitting the evidence is a legal user of the account.

However, when the identity authentication is performed on the user by using weighted scoring, the correctness of an authentication result depends on the number of evidences provided by the user, and the correctness of the authentication result is not high; especially, when the number of evidences submitted by the user is small, the authentication cannot success even the provided evidences are completely correct.

SUMMARY

Accordingly, a classifier training method and apparatus and an identity authentication method and system need to be provided to solve the problem of low correctness of identity authentication performed on a user by using weighted scoring.

A classifier training method, the method including:

acquiring a training sample set, each training sample in the training sample set comprising a user identity attribute and a feature value corresponding to a preset classification condition feature;

determining a classification condition at a root node according to one preset classification condition feature, performing classification on the training samples in the training sample set according to the classification condition at the root node, and acquiring a classification subset corresponding to a child node of the root node; and using the child node of the root node as a current node;

determining a classification condition at the current node according to another preset classification condition feature, performing classification on training samples in a classification subset corresponding to the current node according to the classification condition at the current node, and acquiring a classification subset of a child node of the current node;

using the child node of the current node as a current node, continuously performing the step of determining a classification condition at the current node according to another preset classification condition feature, performing classification on training samples in a classification subset corresponding to the current node according to the classification condition at the current node, and acquiring a classification subset of a child node of the current node, until feature values corresponding to the same preset classification condition feature of training samples in the classification subset corresponding to the current node are respectively the same, or a layer number of the current node reaches a designated layer number; and determining a user identity classification result at the current node according to a user identity attribute corresponding to the maximum number of training samples in the classification subset corresponding to the current node, and acquiring a decision tree classifier.

A classifier training apparatus, the apparatus including:

a training sample set acquiring module, configured to acquire a training sample set, each training sample in the training sample set comprising a user identity attribute and a feature value corresponding to a preset classification condition feature;

a root node training module, configured to determine a classification condition at a root node according to one preset classification condition feature, perform classification on the training samples in the training sample set according to the classification condition at the root node, and acquire a classification subset corresponding to a child node of the root node; and use the child node of the root node as a current node;

an internal node training module, configured to: determine a classification condition at the current node according to another preset classification condition feature, perform classification on training samples in a classification subset corresponding to the current node according to the classification condition at the current node, and acquire a classification subset of a child node of the current node; and further configured to use the child node of the current node as a current node, and continuously perform the step of determining a classification condition at the current node according to another preset classification condition feature, performing classification on training samples in a classification subset corresponding to the current node according to the classification condition at the current node, and acquiring a classification subset of a child node of the current node, until feature values corresponding to the same preset classification condition feature of training samples in the classification subset corresponding to the current node are respectively the same, or a layer number of the current node reaches a designated layer number; and a leaf node training module, configured to determine a user identity classification result at the current node according to a user identity attribute corresponding to the maximum number of training samples in the classification subset corresponding to the current node, and acquire a decision tree classifier.

In the classifier training method and apparatus, training is performed layer by layer from a root node of a decision tree classifier till a leaf node by using training samples, a classification condition at each non-leaf node from the root node to the leaf node is determined according to one preset classification condition feature in the training samples, and the leaf node embodies a user identity classification result. In the decision tree classifier obtained through such training, a random determination path from the root node to the leaf node may embody correlation between multiple types of preset classification condition features, and the classification performance is good. When the decision tree classifier is used to perform identity authentication, not only correctness of each piece of evidence data submitted by a user is considered, correlation between multiple types of user evidence data may also be considered, and therefore, the accuracy of an identity authentication result is high.

An identity authentication method, the method including:

receiving an identity authentication request sent by a user terminal and carrying a to-be-authenticated user identification and to-be-authenticated user evidence data;

acquiring user data corresponding to the to-be-authenticated user identification, and performing authentication on the to-be-authenticated user evidence data according to the acquired user data to obtain an evidence authentication result;

extracting a to-be-authenticated feature value corresponding to a preset classification condition feature according to the to-be-authenticated user evidence data and the obtained evidence authentication result; and determining layer by layer from a classification condition at a root node of a decision tree classifier till a leaf node according to the to-be-authenticated feature value corresponding to the preset classification condition feature, and determining an identity authentication result corresponding to the to-be-authenticated user identification according to a user identity classification result at the leaf node.

An identity authentication system, the system including:

an identity authentication request receiving module, configured to receive an identity authentication request sent by a user terminal and carrying a to-be-authenticated user identification and to-be-authenticated user evidence data;

an evidence authenticating module, configured to acquire user data corresponding to the to-be-authenticated user identification, and perform authentication on the to-be-authenticated user evidence data according to the acquired user data to obtain an evidence authentication result;

a to-be-authenticated feature value extracting module, configured to extract a to-be-authenticated feature value corresponding to a preset classification condition feature according to the to-be-authenticated user evidence data and the obtained evidence authentication result; and an identity authentication result determining module, configured to determine and classify layer by layer from a classification condition at a root node of a decision tree classifier till a leaf node according to the to-be-authenticated feature value corresponding to the preset classification condition feature, and determine an identity authentication result corresponding to the to-be-authenticated user identification according to a user identity classification result at the leaf node.

In the identity authentication method and system, identity authentication is performed in response to an identity authentication request of a user terminal, to-be-authenticated user evidence data carried in the identity authentication request is authenticated first, a to-be-authenticated feature value corresponding to a preset classification condition feature is extracted according to the authentication result, so as to determine and classify layer by layer from a classification condition at a root node of a decision tree classifier according to the to-be-authenticated feature value corresponding to each preset classification condition feature, till an identity authentication result is obtained. The identity authentication performed in such a manner not only considers correctness of each piece of evidence data submitted by a user, but also considers correlation between to-be-authenticated feature values corresponding to various preset classification condition features, and therefore, the accuracy of an identity authentication result is high.

DESCRIPTION OF EMBODIMENTS

To make the objectives, technical solutions and advantages of the present disclosure clearer, the present disclosure is further described in detail through accompanying drawings and embodiments in the following. It should be understood that, specific embodiments described herein are merely used to explain the present disclosure, and are not intended to limit the present disclosure.

Figure 1:
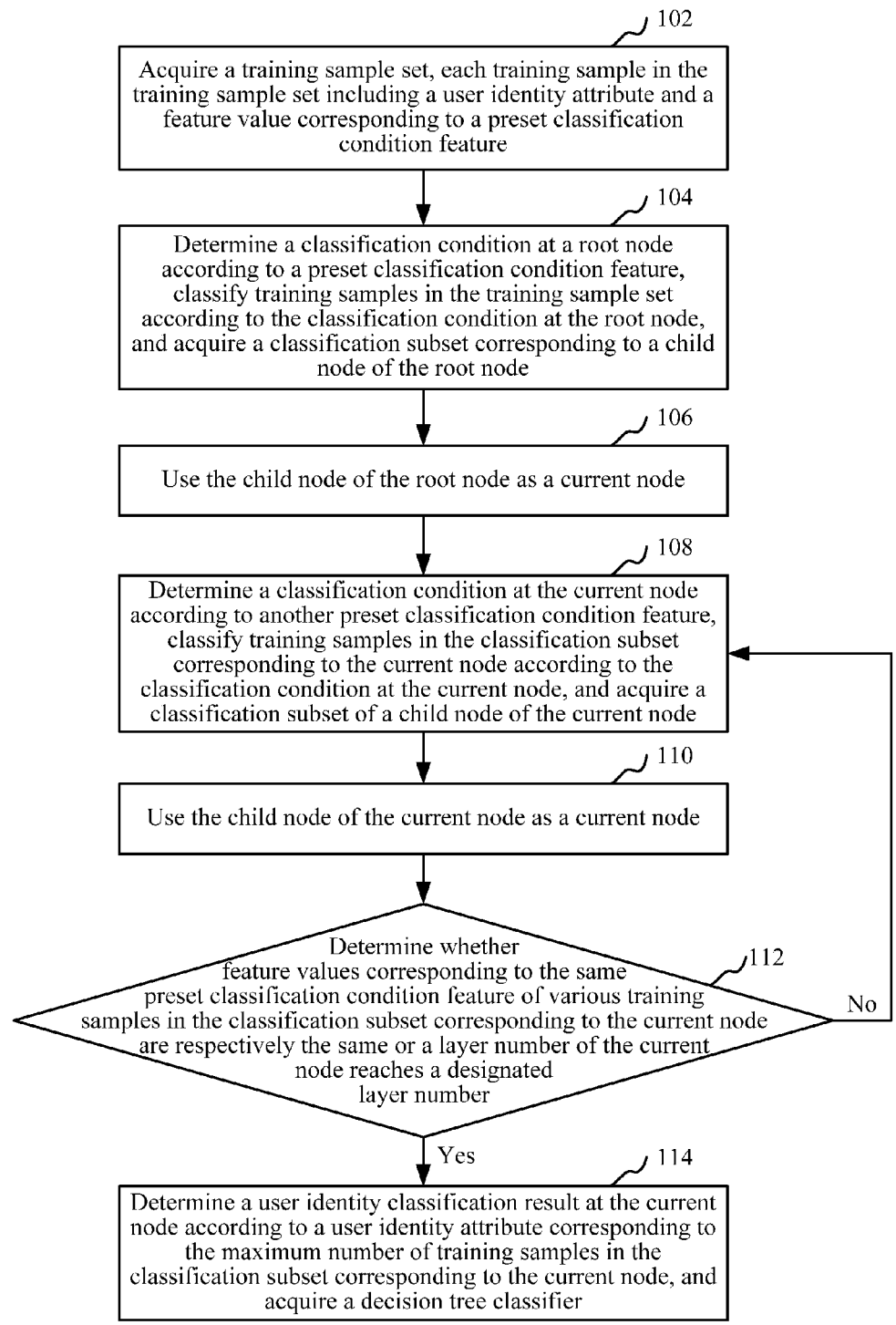
FIG. 1 is a schematic flow chart of a classifier training method in an embodiment.

As shown in FIG. 1, in an embodiment, a classifier training method is provided and used to train a decision tree classifier for identity authentication. The method specifically includes the following steps:

Step 102: Acquire a training sample set, each training sample in the training sample set including a user identity attribute and a feature value corresponding to a preset classification condition feature.

The training sample set is a set of training samples for training the decision tree classifier, where each training sample includes a user identity attribute and a feature value corresponding to each preset classification condition feature, and the number of types of the preset classification condition feature is more than two. The user identity attribute is one of a legal user and an illegal user, respectively indicating that a corresponding training sample is sample data passing or not passing the identity authentication. The training sample set has a training sample whose user identity attribute is a legal user, and also has a training sample whose user identity attribute is an illegal user.

The preset classification condition feature is a conditional-type feature that is preset and needs to be extracted from user evidence data, and the user evidence data is proof data provided by a user using a user terminal and used to indicate that the user is a legal user.

In an embodiment, the preset classification condition feature may include, but is not limited to, at least two of whether a fried assistant authentication exists, whether the number of friends participating the friend assistant authentication and passing the assistant authentication exceeds a preset number threshold, whether there is correct historical password data, whether a quantification score of the correct historical password data exceeds a first preset score threshold, whether there is correct frequently-used address information of account, whether a quantification score of the correct frequently-used address of account exceeds a second preset score threshold, whether the user is in another place abroad, and whether the number of password changes falls within a preset number range.

The friend assistant authentication refers to sending an assistant authentication request to a client corresponding to a user identification having a communication friend relationship with the to-be-authenticated user identification, and receiving an assistant authentication result returned by the client. The assistant authentication result includes passing and not passing, and generally more number of friends participating in the friend assistant authentication and passing the assistant authentication further indicates that the user is a legal user. The historical password data refers to a password used to be used, and quantification thereof may be using a piece of correct historical password data to correspond to one preset score, for example 5 scores, and 2 pieces of correct historical password data correspond to 10 scores. The frequently-used address information of account includes a physical location, and the number of logins and/or a login time length at the physical location exceeding a certain threshold, and may further include a corresponding time parameter, for example, the commonly-used address in 2014 is Shanghai, and the commonly-used address in 2013 is Shenzhen and Chengdu.

The feature value is a specific value corresponding to a preset classification condition feature, and is not limited to be indicated by using a numeral value. For example, if the preset classification condition feature is "where there is friend assistant authentication", a corresponding feature value is "Yes" or "No", and "Yes" or "No" is a feature value respectively. For another example, if the preset classification condition feature is the number range of friends participating in the friend assistant authentication and passing the assistant authentication, a corresponding feature value may be one of {0, 1 to 3, more than 4}.

Step 104: Determine a classification condition at a root node according to a preset classification condition feature, classify training samples in the training sample set according to the classification condition at the root node, and acquire a classification subset corresponding to a child node of the root node.

The training of the decision tree starts from the root node, and specifically, the classification condition at the root node is determined according to one of multiple preset classification condition features of the training samples in the training sample set. The decision tree is an inductive learning algorithm based on examples, and a training process to the decision tree classifier is a process of obtaining an expression form of the decision tree classification according to a group of disordered and irregular tuples. The decision tree classification obtained by final training includes several nodes, where a non-leaf node correspondingly has a classification condition, and a leaf node correspondingly has a user identity classification result. When the decision tree classifier is used for classification, determination and classification are performed layer by layer from a classification condition of a root node until a classification result at the leaf node is obtained. A path constructed by all passed nodes starting from the root node to one leaf node is a determination path.

After the classification condition at the root node is determined, the training samples in the training sample set may be classified according to the classification condition at the root node or according to a preset classification condition feature of the classification condition at the root node, so as to obtain a classification subset corresponding to a child node of the root node, each child node of the root node corresponding to one classification subset. A child node of one node refers to a direct successor node of this node, and one node is a parent node of a child node thereof. Feature values, of training samples in each classification subset, corresponding to preset classification condition features used for determining the preset condition at the root node are all the same.

In one embodiment, the determining the classification condition at the root node according to a preset classification condition feature specifically may include: calculating a decision information entropy according to the number of training samples, in the training sample set, whose user identity attributes are legal users and illegal users, and calculating a classification information entropy corresponding to each feature value of each preset classification condition feature in the training sample set and calculating an average information expectation accordingly, and then calculating an information gain by subtracting the average information expectation from the decision information entropy, and determining the classification condition at the root node according to a preset classification condition feature having the maximum information gain. A calculation formula of the decision information entropy is $I(S1,S2)=-P1 \log_2 P1 - P2 \log_2 P2$, where $P1=S1/(S1+S2)$, and $P2=S2/(S1+S2)$. S1 is the number of training samples, in the training sample set, whose user identity attribute is a legal user, S2 is the number of training samples, in the training sample set, whose user identity attribute is an illegal user; P1 indicates a probability of existence of the training samples, whose user identity attribute is a legal user, in the training sample set, P2 indicates a probability of existence of the training samples, whose user identity attribute is an illegal user, in the training sample set; and the base number 2 may be replaced with another numeral value within a base number value range. For a calculation formula of a classification information entropy corresponding to each preset classification condition feature, S1 and S2 in $I(S1,S2)$ may be replaced with the number of training samples of each feature value corresponding to a preset classification condition feature respectively, and definitely, the number of types of the feature values is not limited to 2. An average information expectation is a weighted sum of classification information entropies of various feature values of one type of preset classification condition feature, and a weight is a proportion of the corresponding feature value.

In one embodiment, the step of determining the classification condition at the root node according to one type of preset classification condition feature specifically includes: counting the number of training samples, in the training sample set, in which a user identity attribute corresponding to each feature value of each preset classification condition feature is a legal user, and determining the classification condition at the root node according to corresponding preset classification condition features corresponding to feature values having the maximum counted number in the training sample set.

In this embodiment, in the range of the training sample set, the number of training samples in which a user attribute corresponding to each feature value of each preset classification condition feature is a legal user is counted, and a preset classification condition feature corresponding to the feature values having the maximum counted number has a better performance of recognizing a legal user. Here, when the preset classification condition feature is selected, a preset classification condition feature capable of better recognizing a legal user is preferred, and in this way, the classification condition at the root node is determined according to the preset classification condition feature corresponding to the feature values having correspondingly maximum counted number, such that the classification condition at the root node can better recognize a legal user.

Step 106: Use the child node of the root node as a current node.

The current node refers to a node currently to be trained, and using the root node as the current node is giving an initial value for the current node, so as to perform a circular treatment on the current node.

Step 108: Determine a classification condition at the current node according to another preset classification condition feature, classify training samples in the classification subset corresponding to the current node according to the classification condition at the current node, and acquire a classification subset of a child node of the current node.

The another preset classification condition feature refers to a preset classification condition feature different from the preset classification condition feature used to determine a classification condition at each node in a current path corresponding to the current node. When the current path corresponding to the current node refers to a path starting from the root node to the current node, if the current node is the root node, the current path corresponding to the current node is the root node itself. After the classification condition at the current node is determined according to another preset classification condition feature, classification subsets corresponding to the current node are classified according to the classification condition at the current node or the preset classification condition feature used to determine the classification condition at the current node, so as to obtain a classification set corresponding to a child node of the current node, each child node of the current node corresponding to a classification subset. Feature values, of training samples in each classification subset, corresponding to preset classification condition features used for determining the preset condition at the root node are all the same.

In an embodiment, the determining a classification condition at the current node according to another preset classification condition feature specifically may be: removing the preset classification condition features used to determine classification conditions at various nodes in the current path for the current path corresponding to the current node, to obtain residual preset classification condition features; then calculating a decision information entropy corresponding to the current node by using the number of training samples, in the classification subset corresponding to the current node, whose user identity attributes are legal users and illegal users, calculating a classification information entropy corresponding to each feature value of each residual preset classification condition feature in the classification subset corresponding to the current node and calculating an average information expectation accordingly, calculating an information gain by subtracting the average information expectation from the decision information entropy corresponding to the current node, so as to determine the classification condition at the current node according to the residual preset classification condition feature having the maximum information gain.

In an embodiment, the step of determining a classification condition at the current node according to another preset classification condition feature specifically includes: determining residual preset classification condition features corresponding to the current node except for the preset classification condition feature used to determine the classification condition at the node in the current path, counting the number of training samples, in the classification subset corresponding to the current node, in which a user identity attribute corresponding to each feature value of each preset classification condition feature is a legal user, and determining the classification condition at the current node according to a residual preset classification condition feature corresponding to feature values having the maximum counted number corresponding to the current node.

Specifically, for the current path corresponding to the current node, after the preset classification condition features used to determine the classification conditions at various nodes in the current path are removed, residual preset classification condition features are obtained. In the range of the classification subset corresponding to the current node, the number of training samples in which a user attribute corresponding to each feature value of each residual preset classification condition feature is a legal user is counted, and in this way, within the range of the classification subset corresponding to the current node, the residual preset classification condition feature corresponding to the feature values having the maximum counted number has a better performance of recognizing a legal user. The classification condition at the current node is determined according to the residual preset classification condition feature corresponding to the feature value having the maximum counted number, such that the classification condition at the current node can better recognize the legal user.

Step 110: Use the child node of the current node as a current node.

Specifically, after the classification condition at the current node is determined, a child node of the current node needs to be further trained, and each child of the current node is trained respectively as a current node.

Step 112: Determine whether feature values corresponding to the same preset classification condition feature of various training samples in the classification subset corresponding to the current node are respectively the same or a layer number of the current node reaches a designated layer number. If yes, step 114 is performed, and if no, step 108 is performed continuously.

Step 112 is a determination condition used to determine whether to end circulation, if for the training samples in the classification subset corresponding to the current node, the feature values corresponding to the same preset classification condition feature are respectively the same, for example, feature values corresponding to the first preset classification condition feature are all "Yes", feature values corresponding to the second preset classification condition feature are all "No", or the like, it indicates that the training samples in the classification subset corresponding to the current node can no longer be further classified according to the preset classification condition feature, and the current node is a leaf node. Or, if the layer number of the current node reaches a designated layer number, internal nodes are not needed to be trained, and the current node is a leaf node. The layer number of the current node equals to the number of nodes in the current path corresponding to the current node, for example, the layer number of the root node is 1, and the layer number of the child node of the root node is 2. When it is determined as No in step 112, step 108 is performed continuously, and the another preset classification condition feature in step 108 is different from another preset classification condition feature in the previous circulation.

Step 114: Determine a user identity classification result at the current node according to a user identity attribute corresponding to the maximum number of training samples in the classification subset corresponding to the current node, and acquire a decision tree classifier.

Specifically, when it is determined Yes in step 112, it may be determined that the current node is a leaf node, and the number of training samples, in the classification subset corresponding to the current node, whose user identity attribute is a legal user may be counted, thereby calculating whether a proportion of the counted number in the total number of training samples in the classification subset corresponding to the current node exceeds 0.5. If yes, it is determined that a user identity classification result at the current node is a legal user or identity authentication is passed, and if no, it is determined that a user identity classification result at the current node is an illegal user or identity authentication is failed. Finally, a decision tree classifier including several determination paths formed by a root node, internal nodes and leaf nodes is obtained.

In the classifier training method, training is performed layer by layer from a root node of a decision tree classifier till a leaf node by using training samples, a classification condition at each non-leaf node from the root node to the leaf node is determined according to one preset classification condition feature in the training samples, and the leaf node embodies a user identity classification result. In the decision tree classifier obtained through such training, a random determination path from the root node to the leaf node may embody coherence between multiple types of preset classification condition features, and the classification performance is good. When the decision tree classifier is used to perform identity authentication, not only correctness of each piece of evidence data submitted by a user is considered, coherence between multiple types of user evidence data may also be considered, and therefore, the accuracy of an identity authentication result is high.

Figure 2:
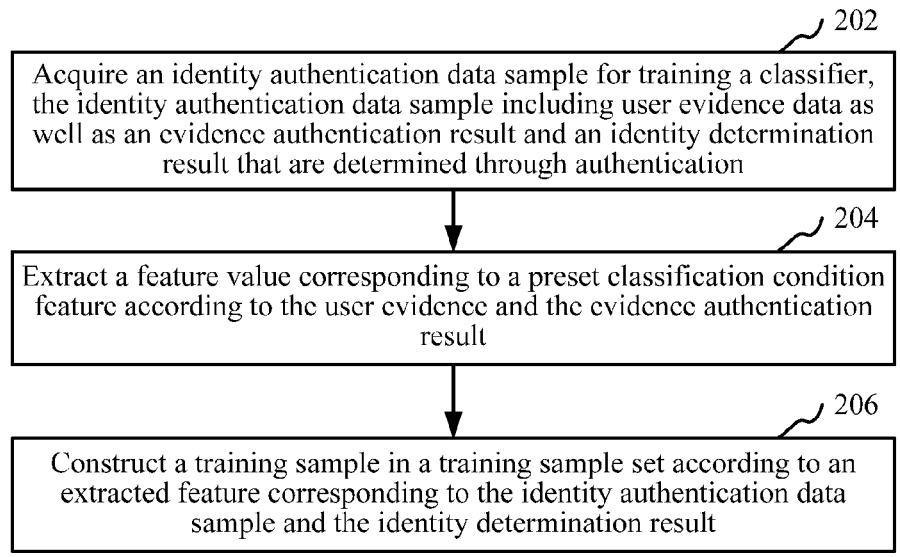
FIG. 2 is a schematic flow chart of steps of acquiring a training sample set in an embodiment.

As shown in FIG. 2, in an embodiment, step 102 specifically includes the following steps:

Step 202: Acquire an identity authentication data sample for training a classifier, the identity authentication data sample including user evidence data as well as an evidence authentication result and an identity determination result that are determined through authentication.

The identity authentication data sample is a sample of identity authentication data undergone identity verification, and the identity authentication data refers to data for user identity authentication. The identity authentication data sample includes user evidence data, and the user evidence data is proof data submitted by a user using a user terminal and used to prove that the user is a legal user, such as filled commonly-used address information of account, and filled historical password data.

The identity authentication data sample further includes an evidence authentication result and an identity determination result determined through manual and/or automatic authentication. The evidence authentication result is an authentication result provided after performing authentication on the user evidence data in the identity authentication data sample, and indicates whether the user evidence data is correct or wrong. The identity determination result is a determination result that is determined in advance by identity authentication and indicates whether a user providing the user evidence data is a legal user or an illegal user.

Step 204: Extract a feature value corresponding to a preset classification condition feature according to the user evidence and the evidence authentication result.

For each identity authentication data sample, a feature value corresponding to a preset classification condition feature is extracted according to user evidence data and an evidence authentication result that are included in the identity authentication data sample. The type of the preset classification condition feature extracted here is related to the type of the user evidence data included in the identity authentication data sample of the user. One piece of user evidence data may be used to extract feature values corresponding to multiple preset classification condition features.

For example, if one piece of user evidence data included by one identity authentication data sample provides two pieces of historical password data, and an evidence authentication result is that one of the two pieces of historical password data is correct and the other one is wrong. The corresponding preset classification condition feature may be "whether there is correct historical password data" and "whether the number of correct historical password data is more than 2", and the extracted feature values corresponding to the two preset classification condition features are respectively "Yes" and "No".

Step 206: Construct a training sample in the training sample set according to an extracted feature corresponding to the identity authentication data sample and the identity determination result.

For each identity authentication data sample, a feature value corresponding to a preset classification condition feature is extracted, the feature value extracted correspondingly for each identity authentication data sample is used as a feature value of each training sample, a corresponding identity determination result is used as a user identity attribute of each training sample, and in this way, a training sample set including several training samples is obtained.

In this embodiment, a feature value corresponding to a preset classification condition feature is extracted from user evidence data to construct a training sample, and because a decision tree classifier needs to determine classification at each non-leaf node, the training sample is more suitable than the identity authentication data sample for training to obtain a decision tree classifier; moreover, more detail information may be explored from the identity authentication data sample, such that a classification result of the decision tree classifier is more accurate.

Figure 3:
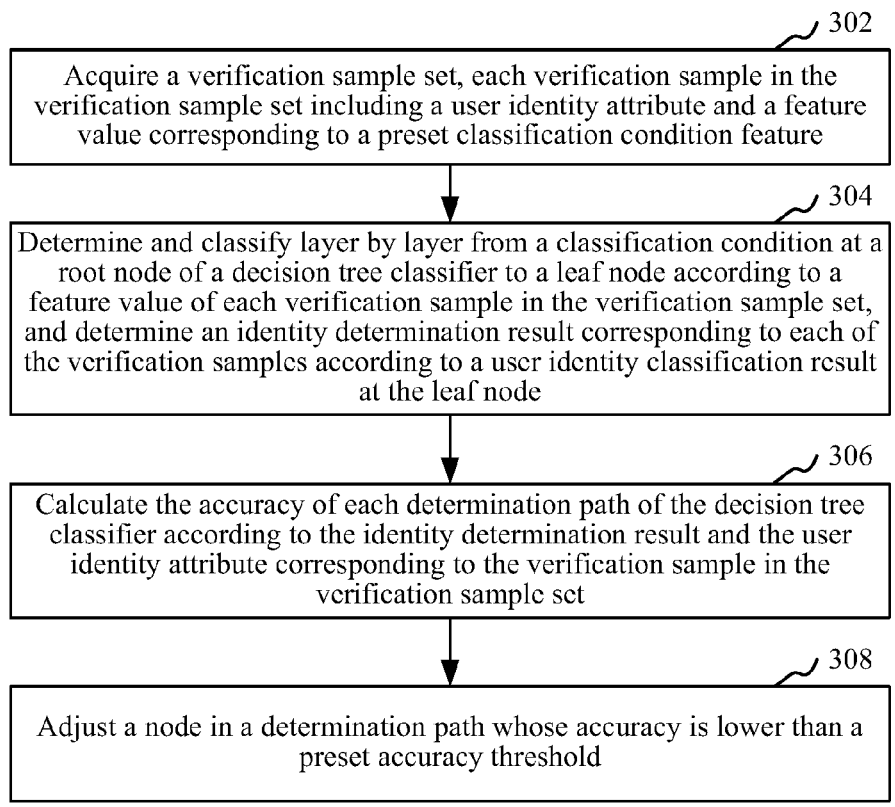
FIG. 3 is a schematic flow chart of steps of pruning a decision tree classifier according to a verification sample in an embodiment.

As shown in FIG. 3, in an embodiment, the classifier training method further includes a step of pruning a decision tree classifier according to a verification sample, specifically including the following steps:

Step 302: Acquire a verification sample set, each verification sample in the verification sample set including a user identity attribute and a feature value corresponding to a preset classification condition feature.

The verification sample is used to verify a classification performance of the decision tree classifier, and when it is determined by the verification sample that the classification performance of the decision tree classifier is poor, pruning is performed on the decision tree classifier, and the pruning is a process of improving the classification accuracy of the decision tree by modifying a determination path of the decision tree. Each verification sample in the verification sample set has a form matching with the training sample in the training sample set, and includes a user identity attribute and a feature value corresponding to a preset classification condition feature. The preferred verification sample does not belong to the training sample set.

In an embodiment, step 302 specifically includes: acquiring an identity authentication data sample used to verify a decision tree classifier, including user evidence data as well as an evidence authentication result and an identity determination result determined through verification; extracting the feature value corresponding to the preset classification condition feature according to the user evidence and the evidence authentication result; and constructing the verification sample in the verification sample set according to the extracted feature value and the identity determination result corresponding to the identity authentication data sample used to verify the decision tree classifier.

Step 304: Determine and classify layer by layer from a classification condition at the root node of the decision tree classifier till a leaf node according to a feature value of each verification sample in the verification sample set, and determine an identity determination result corresponding to each of the verification samples according to a user identity classification result at the leaf node.

The process of verifying the decision tree is classifying a verification sample by using the decision tree under the premise of knowing a user identity attribute of the verification sample, so as to determine whether it is consistent with the known user identity attribute, if yes, it indicates that the classification is correct, and if not, it indicates that the classification is wrong, thereby achieving the objective of verifying the performance of the decision tree classifier.

Specifically, when each verification sample is classified, according to a feature value corresponding to a preset classification condition feature of the verification sample, determination classification is performed first according to a classification condition at a root node of the decision tree classifier to reach a child node of the root node, and determination classification is performed on the verification sample according to the classification condition at the child node of the root node to reach a node at a layer 3, and so on. Till a leaf node is reached, if a determination path of which an identity classification result at the leaf node is a legal user is found, it is determined that an identity determination result of the verification sample is a legal user or the identity authentication is passed. If no determination path of which an identity classification result at the leaf node is a legal user is found, it is determined that an identity determination result of the verification sample is an illegal user or the identity authentication is failed.

Step 306: Calculate the accuracy of each determination path of the decision tree classifier according to the identity determination result and the user identity attribute corresponding to the verification sample in the verification sample set.

Specifically, it is determined whether an identity determination result of each verification sample in the verification sample set matches with the user identity attribute of the verification sample, if they match with each other, it is recorded that the determination path used to determine the identity determination result of the verification sample has one correct determination; and if they do not match with each other, it is recorded that the determination path used to determine the identity determination result of the verification sample has one wrong determination, so as to accumulate records in this way. The accuracy of the determination path may be calculated and obtained by dividing a sum of correct determinations and wrong determinations of the determination path by the total number of correct determinations of the determination path, thereby calculating and obtaining the accuracy of each determination path.

Step 308: Adjust a node in a determination path whose accuracy is lower than a preset accuracy threshold.

The accuracy threshold is a quantified numeral value that is set in advance and used to determine whether a certain determination path of the decision tree classifier reaches classification performance standard. Specifically, for a determination path whose accuracy is lower than a preset accuracy threshold, a leaf node thereof is deleted and a parent node of the deleted leaf node is used as a new leaf node, so as to determine a user identity classification result at the new leaf node according to a user identity attribute corresponding to the maximum number of training samples in a new classification subset corresponding to the new leaf node, which is equivalent to combining the two determination paths. The accuracy of the combined determination path is calculated again after the pruning, and the determination path is adjusted continuously if the accuracy is lower than the preset accuracy threshold. In other embodiments, multiple determination paths which have accuracies lower than the preset accuracy threshold and whose leaf nodes are adjacent to each other may be combined to achieve the objective of adjusting the node, in the determination path, whose accuracy is lower than the preset accuracy threshold.

In this embodiment, the classification performance of the decision tree classifier is verified by using the verification sample, so as to perform correction when the classification performance of a certain determination path of the decision tree classifier is low, thereby improving the classification accuracy of the whole decision tree classifier.

In an embodiment, the classifier training method further includes a step of adjusting a determination path according to user feedback information, specifically including: acquiring user feedback information, and adjusting, according to the feedback information, a node in a determination path related to the feedback information in the decision tree classifier.

In the above actual application of the decision tree classifier used for user identity authentication, a situation that user evidence data provided by a user is correct but the user is determined as an illegal user may occur, or a situation that a user does not provide user evidence data but another malicious user provides false user evidence data and determined as a legal user may occur, in this situation, the real user may provide feedback information, such as appeal and suggestion, and in this case, it is required to perform pruning on a determination path related to the feedback information according to the feedback information, so as to improve the classification accuracy of the decision tree classifier. Specifically, a leaf node of the determination path may be deleted, and a parent node of the deleted leaf node is used as a new leaf node, so as to determine a user identity classification result at the new leaf node according to a user identity attribute corresponding to the training samples having the maximum number in a new classification subset corresponding to the new leaf node.

The principle of the classifier training method is described by using a specific application scenario in the following, and specifically includes the following steps:

Acquire an identity authentication data sample, the identity authentication data sample including user evidence data as well as an evidence authentication result and an identity determination result that are determined through authentication. One identity authentication data sample is shown in Table 1:

TABLE 1

| User evidence data | Invite 3 friends to participate in assistant authentication | Fill 2 pieces of historical password data | Fill commonly-used address information in 2014 | IP address when providing user evidence data |
|---|---|---|---|---|
| Evidence authentication result | 3 friend assistant authentications are all passed | One piece of historical password data is correct, and the other one is wrong | The filled commonly-used address information in 2014 is correct | It is determined that the user is in another place abroad according to the IP address thereof |
| Identity determination result | | | Illegal user | |

Figure 5:
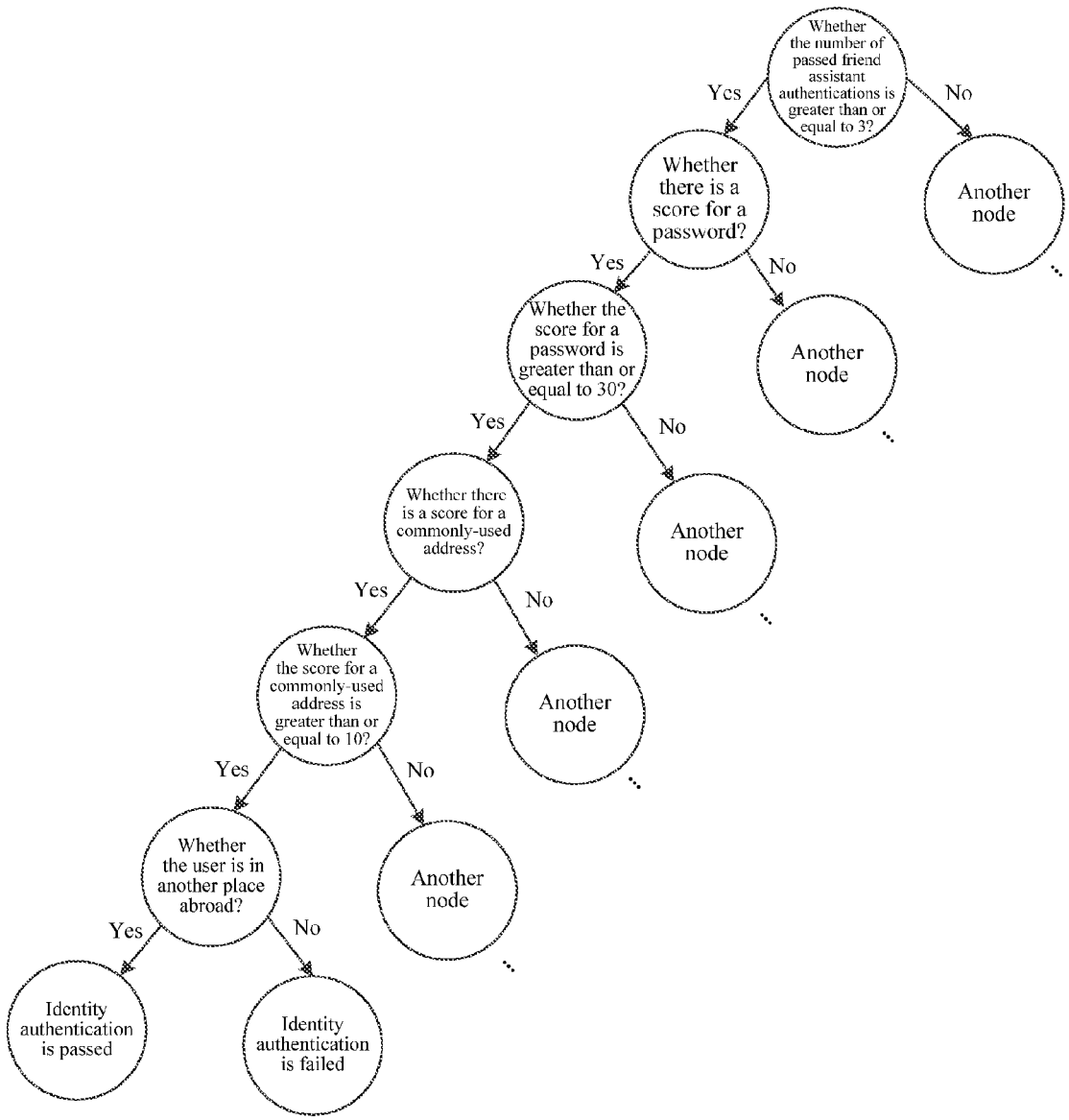
FIG. 5 is a schematic diagram of a local data structure of a decision tree classifier in a specific application scenario.

The identity authentication data samples in the acquired identity authentication data sample set are randomly classified into two types, one type is used to train a classifier, and the other type is used to verify the classifier obtained by the training. For two types of identity authentication data sample, a feature value corresponding to a preset classification condition feature is extracted according to user evidence data and an evidence authentication result that are included in each of the identity authentication data samples. After the feature value is extracted, training samples in the training sample set are constructed according to the extracted feature value and the identity determination result in the identity authentication data sample used to train the classifier; and verification samples in the verification sample set are constructed according to the extracted feature value and the identity determination result corresponding to the identity authentication data sample used to verify the classifier obtained by the training. Each training sample in the training sample set includes a user identity attribute and a feature value corresponding to a preset classification condition feature; each verification sample in the verification sample set includes a user identity attribute and a feature value corresponding to a preset classification condition feature. It is preset that one piece of correct historical password data is marked as 15 scores, and a correct commonly-used address information is marked as 5 scores. A training sample obtained according to the identity authentication data sample shown in Table 1 in the foregoing is shown in Table 2.

condition feature is a legal user, and determine the classification condition at the root node according to corresponding preset classification condition features corresponding to feature values having the maximum counted number in the training sample set. Referring to FIG. 5, a schematic diagram of a local data structure of a decision tree classifier is shown. It is assumed that there are 100 training samples in total in the training sample set, in which 50 training samples are training samples whose user identity attributes are legal users. Through counting, in the 50 training samples, the number of training samples in which the number of passed friend assistant authentications is greater than or equal to 3 is 45, which is greater than other counted number, "whether the number of passed friend assistant authentications is greater than or equal to 3" is used as a classification condition at the root node of the decision tree classifier. A training sample in the training sample set is classified according to the classification condition at the root node, a classification subset corresponding to a child node of the root node is obtained, and the child node of the root node is used as a current node respectively.

The step of implementing training on internal node specifically includes: determining residual preset classification condition features corresponding to the current node except for the preset classification condition feature used for determining the classification condition at a node of a current path, counting the number of training samples, in the classification subset corresponding to the current node, in which a user identity attribute corresponding to each feature value of each residual preset classification condition feature is a legal user, and determining the classification condition at the current node according to residual preset classification con-

TABLE 2

| Preset classification condition feature | Whether the number of passed friend assistant authentication is greater than or equal to 3 | Whether there is a score for a password | Whether the score for the password is greater than or equal to 30 | Whether there is a score for a commonly used address | Whether the score for the commonly used address is greater than or equal to 10 | Whether the user is in another place abroad |
|---|---|---|---|---|---|---|
| Feature value | Yes | Yes | No | Yes | No | Yes |
| User identity attribute | | | | Illegal user | | |

Then, count the number of training samples, in the training sample set, in which a user identity attribute corresponding to each feature value of each preset classification condition features corresponding to feature values having the maximum counted number corresponding to the current node.

The preset classification condition feature of "whether the number of passed friend assistant authentications is greater than or equal to 3" has been used to determine the classification condition at the root node, and is removed to obtain residual preset classification condition features. There are totally 60 training samples in the classification subset corresponding to the current node, in which 45 training samples are training samples whose user identity attributes are legal users, and after counting, the feature value having the maximum counted number corresponding to the current node has a score for a password and corresponds to totally 40 training samples, and therefore, it is determined, according to the residual preset classification condition feature "whether there is a score for a password", that the classification condition at the current node is "whether there is a score for a password". A child node of the current node is used as a current node respectively to continuously implement the step of training an internal node, until feature values corresponding to the same preset classification condition feature of various training samples in the classification subset corresponding to the current node are respectively the same or a layer number of the current node reaches a designated layer number.

The current node is used as a leaf node so as to determine a user identity classification result at the current node according to user identity attributes, in the classification subset corresponding to the current node, corresponding to the maximum number of training samples, if there are totally 25 training samples in the classification subset corresponding to the current node, in which user identity attributes of 24 training samples are legal users, it may be set that the user identity classification result at the current node is that the identity authentication is passed. After training is performed layer by layer to obtain all internal nodes and leaf nodes, a trained decision tree classifier is obtained.

Finally, pruning is performed, according to the verification sample set, on the decision tree classifier obtained by the training, and specifically, determination and classification are performed layer by layer starting from the classification condition at the root node of the decision tree classifier till a leaf node according to a feature value of each verification sample in the verification sample set, and an identity determination result for each verification sample is determined according to the user identity classification result at the leaf node. An accuracy of each determination path in the decision tree classifier is calculated according to the identity determination result and the user identity attribute corresponding to the verification sample in the verification sample set, and a node, in the determination path, whose accuracy is lower than a preset accuracy threshold is adjusted.

Figure 4:
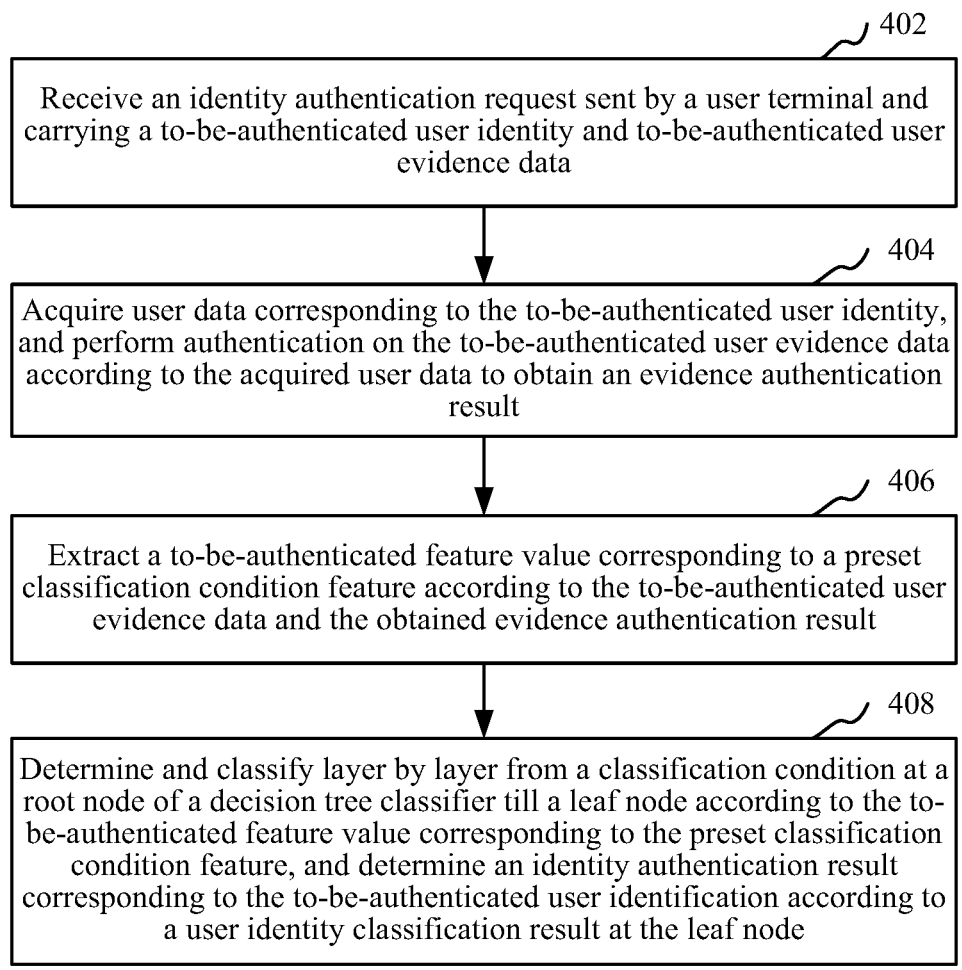
FIG. 4 is a schematic flow chart of an identity authentication method in an embodiment.

As shown in FIG. 4, in an embodiment, an identity authentication method is provided, and this embodiment is described by using an example that the method is applied to an identity authentication server. The method specifically includes the following steps:

Step 402: Receive an identity authentication request sent by a user terminal and carrying a to-be-authenticated user identity and to-be-authenticated user evidence data.

After a real user losses a login password corresponding to a user identification for uniquely identity an identity thereof, the user may provide a to-be-authenticated user identification on a user terminal by using an appeal page provided by a user identification manager, and provide, independently or under the guide of the appeal page, to-be-authenticated user evidence data used to prove that the user is a real owner of the to-be-authenticated user identification thereof. Therefore, the user terminal sends an identity authentication request carrying the to-be-authenticated user identification and the to-be-authenticated user evidence data to the identity authentication server, and the identity authentication server receives the identity authentication request and performs identity authentication accordingly. The user identification may be an account, for example, an account for logging in to an instant messaging client. Definitely, a malicious user may attempt to provide a fake to-be-authenticated user identification and fake to-be-authenticated user evidence data through the appeal page, to implement the objective of stealing the user identification, and in this case, the identity authentication server is required to discriminate the user according to the identity authentication request to ensure the security of the user account.

Step 404: Acquire user data corresponding to the to-be-authenticated user identity, and perform authentication on the to-be-authenticated user evidence data according to the acquired user data to obtain an evidence authentication result.

User data, such as historical password data, a user name used to be used, and a login place used to be used, is stored in advance corresponding to the to-be-authenticated user identification, the identity authentication server, when implementing the identity authentication, uses the to-be-authenticated user identification to acquire corresponding user data, so as to verify the to-be-authenticated user evidence data carried in the identity authentication request, thereby obtaining an evidence authentication result used to indicate whether the to-be-authenticated user evidence data is correct or wrong.

For example, if the to-be-authenticated user evidence data includes two pieces of historical password data, the identity authentication server acquires a historical password data list corresponding to the to-be-authenticated user identification, and the list includes all password data used by the to-be-authenticated user identification within a preset time period (for example, 3 years). The identity authentication server determines respectively whether the two pieces of historical password data included in the to-be-authenticated user evidence data exist in the historical password data list, and if one of the two pieces of historical password data exists in the list while the other does not exist, an evidence authentication result about that one historical password data is correct and the other historical password is wrong is obtained.

Step 406: Extract a to-be-authenticated feature value corresponding to a preset classification condition feature according to the to-be-authenticated user evidence data and the obtained evidence authentication result.

A corresponding to-be-authenticated feature value corresponding to a preset classification condition feature is extracted according to the to-be-authenticated user evidence data and the corresponding evidence authentication result. Here, the type of the extracted preset classification condition feature is related to the type of the to-be-authenticated user evidence data. One piece of to-be-authenticated user evidence data may be used to extract to-be-authenticated feature values corresponding to multiple preset classification condition features.

For example, if one type of to-be-authenticated user evidence data is two pieces of historical password data, the evidence authentication result is that one of the two pieces of historical password data is correct and the other is wrong. The corresponding preset classification condition feature is "whether there is correct historical password data" and "whether the number of correct historical password data is more than 2", and the extracted to-be-authenticated feature values corresponding to the two preset classification condition features are respectively "Yes" and "No".

Step 408: Determine and classify layer by layer from a classification condition at a root node of a decision tree classifier till a leaf node according to the to-be-authenticated feature value corresponding to the preset classification condition feature, and determine an identity authentication result corresponding to the to-be-authenticated user identification according to a user identity classification result at the leaf node.

Specifically, according to a to-be-authenticated feature value corresponding to a preset classification condition feature, determination classification is performed first according to a classification condition at a root node of the decision tree classifier to reach a child node of the root node, and determination classification is performed according to the classification condition at the child node of the root node to reach a node at a layer 3, and so on. Till a leaf node is reached, if a determination path of which an identity classification result at the leaf node is a legal user is found, it is determined that an identity determination result of this identity authentication is a legal user or the identity authentication is passed. Till a leaf node is reached, if no determination path of which an identity classification result at the leaf node is a legal user can be found, it is determined that an identity determination result of this identity authentication is and illegal user or the identity authentication is failed. In an embodiment, the decision tree classifier is obtained by training using the classifier training method according to any of the above embodiments.

a user, but also considers correlation between to-be-authenticated feature values corresponding to various preset classification condition features, and therefore, the accuracy of an identity authentication result is high.

The principle of the above identity authentication method is described by using another specific application scenario, and the application scenario is described by using the identity authentication method being applied to an identity authentication server as an example. Specifically, the following steps are included:

The above decision tree classifier obtained by training is applied to the above identity authentication method to implement identity authentication, and first, the identity authentication server receives an identity authentication request sent by a user terminal and carrying a to-be-authenticated user identification and to-be-authenticated user evidence data. Then, user data corresponding to the to-be-authenticated user identity is acquired, and authentication is performed on the to-be-authenticated user evidence data according to the acquired user data to obtain an evidence authentication result. For example, the to-be-authenticated user evidence data submitted by the user and an evidence authentication result obtained accordingly are shown in Table 3:

TABLE 3

| To-be-authenticated user evidence data | Invite 3 friends to participate in assistant authentication | Fill 2 pieces of historical password data | Fill commonly-used address information in 2013 and 2014 | IP address when providing user evidence data |
|---|---|---|---|---|
| Evidence authentication result | 3 friend assistant authentications are all passed | 2 pieces of historical password data are all correct | The filled 2 pieces of commonly-used address information are all correct | It is determined that the user is in another place abroad according to the IP address thereof |

In the identity authentication method, an identity authentication server performs identity authentication in response to an identity authentication request of a user terminal, to-be-authenticated user evidence data carried in the identity authentication request is authenticated first, a to-be-authenticated feature value corresponding to a preset classification condition feature is extracted according to the authentication result, so as to determine and classify layer by layer from a classification condition at a root node of a decision tree classifier according to the to-be-authenticated feature value corresponding to each preset classification condition feature, till an identity authentication result is obtained. The identity authentication performed in such a manner not only considers correctness of each piece of evidence data submitted by The to-be-authenticated feature value corresponding to the preset classification condition feature is extracted according to the to-be-authenticated user evidence data and the obtained evidence authentication result, for example, the to-be-authenticated feature value corresponding to the preset classification condition feature extracted according to the to-be-authenticated user evidence data and the corresponding evidence authentication result in Table 3 is shown in Table 4:

TABLE 4

| Preset classification condition feature | Whether the number of passed friend assistant authentication is greater than or equal to 3 | Whether there is a score for a password | Whether the score for the password is greater than or equal to 30 | Whether there is a score for a commonly used address | Whether the score for the commonly used address is greater than or equal to 10 | Whether the user is in another place abroad |
|---|---|---|---|---|---|---|
| Feature value | Yes | Yes | Yes | Yes | Yes | Yes |

Determination and classification are performed layer by layer starting from a classification condition at a root node of a decision tree classifier till a leaf node according to the to-be-authenticated feature value corresponding to the preset classification condition feature, the user identity classification result at the leaf node is that the identity authentication is passed, and it is determined that an identity authentication result of the identity authentication corresponding to the to-be-authenticated user identification is that the identity authentication is passed. In this case, the user submitting the identity authentication request may be notified, by using a preset communications manner such as an email and a short message, that the identity authentication is passed, and is guided to change the login password corresponding to the to-be-authenticated user identification.

Figure 6:
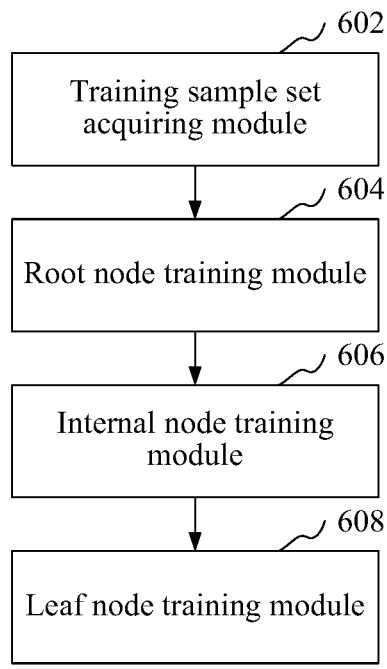
FIG. 6 is a structural block diagram of a classifier training apparatus in an embodiment.

As shown in FIG. 6, in an embodiment, a classifier training apparatus is provided, and the apparatus includes a training sample set acquiring module 602, a root node training module 604, an internal node training module 606 and a leaf node training module 608.

The training sample set acquiring module 602 is configured to acquire a training sample set, each training sample in the training sample set including a user identity attribute and a feature value corresponding to a preset classification condition feature.

The training sample set is a set of training samples for training the decision tree classifier, where each training sample includes a user identity attribute and a feature value corresponding to each preset classification condition feature, and the number of types of the preset classification condition feature is more than two. The user identity attribute is one of a legal user and an illegal user, respectively indicating that a corresponding training sample is sample data passing or not passing the identity authentication. The training sample set has a training sample whose user identity attribute is a legal user, and also has a training sample whose user identity attribute is an illegal user.

In an embodiment, the preset classification condition feature may include, but is not limited to, at least two of whether a fried assistant authentication exists, whether the number of friends participating the friend assistant authentication and passing the assistant authentication exceeds a preset number threshold, whether there is correct historical password data, whether a quantification score of the correct historical password data exceeds a first preset score threshold, whether there is correct frequently-used address of account, whether a quantification score of the correct frequently-used address of account exceeds a second preset score threshold, whether the user is in another place abroad, and whether the number of password changes falls within a preset number range. The feature value is a specific value of a corresponding preset classification condition feature, and is not limited to be indicated by using a numeral value.

The root node training module 604 is configured to determine a classification condition at a root node according to one preset classification condition feature, perform classification on the training samples in the training sample set according to the classification condition at the root node, and acquire a classification subset corresponding to a child node of the root node; and use the child node of the root node as a current node.

The training of the decision tree starts from the root node, and the root node training module 604 is specifically configured to determine the classification condition at the root node according to one of multiple preset classification condition features of the training samples in the training sample set. The decision tree classification obtained by final training includes several nodes, where a non-leaf node correspondingly has a classification condition, and a leaf node correspondingly has a user identity classification result.

After the classification condition at the root node is determined, the root node training module 604 may be configured to classify the training samples in the training sample set according to the classification condition at the root node or according to a preset classification condition feature of the classification condition at the root node, so as to obtain a classification subset corresponding to a child node of the root node, each child node of the root node corresponding to one classification subset. Feature values, of training samples in each classification subset, corresponding to preset classification condition features used for determining the preset condition at the root node are all the same.

In one embodiment, the root node training module 604 may be configured to calculate a decision information entropy according to the number of training samples, in the training sample set, whose user identity attributes are legal users and illegal users, and calculate a classification information entropy corresponding to each feature value of each preset classification condition feature in the training sample set and calculating an average information expectation accordingly, and then calculate an information gain by subtracting the average information expectation from the decision information entropy, and determine the classification condition at the root node according to a preset classification condition feature having the maximum information gain.

In an embodiment, the root node training module 604 may be configured to count the number of training samples, in the training sample set, in which a user identity attribute corresponding to each feature value of each preset classification condition feature is a legal user, and determine the classification condition at the root node according to corresponding preset classification condition features corresponding to feature values having the maximum counted number in the training sample set. In this embodiment, the root node training module 604 is configured to count, in the range of the training sample set, the number of training samples in which a user attribute corresponding to each feature value of each preset classification condition feature is a legal user, where a preset classification condition feature corresponding to the feature values having the maximum counted number has a better performance of recognizing a legal user. Here, when the preset classification condition feature is selected, a preset classification condition feature capable of better recognizing a legal user is preferred, and in this way, the classification condition at the root node is determined according to the preset classification condition feature corresponding to the feature values having correspondingly maximum counted number, such that the classification condition at the root node can better recognize a legal user.

The current node refers to a node currently to be trained, and using the root node as the current node is giving an initial value for the current node, so as to perform a circular treatment on the current node.

The internal node training module 606 is configured to determine a classification condition at the current node according to another preset classification condition feature, perform classification on training samples in a classification subset corresponding to the current node according to the classification condition at the current node, and acquire a classification subset of a child node of the current node; and further configured to use the child node of the current node as a current node, and continuously perform the step of determining a classification condition at the current node according to another preset classification condition feature, performing classification on training samples in a classification subset corresponding to the current node according to the classification condition at the current node, and acquiring a classification subset of a child node of the current node, until feature values corresponding to the same preset classification condition feature of training samples in the classification subset corresponding to the current node are respectively the same, or a layer number of the current node reaches a designated layer number.

The another preset classification condition feature refers to a preset classification condition feature different from the preset classification condition feature used to determine a classification condition at each node in a current path corresponding to the current node. When the current path corresponding to the current node refers to a path starting from the root node to the current node, if the current node is the root node, the current path corresponding to the current node is the root node itself. The internal node training module 606 is configured to: after the classification condition at the current node is determined according to another preset classification condition feature, classify classification subsets corresponding to the current node are classified according to the classification condition at the current node or the preset classification condition feature used to determine the classification condition at the current node, so as to obtain a classification set corresponding to a child node of the current node, each child node of the current node corresponding to a classification subset. Feature values, of training samples in each classification subset, corresponding to preset classification condition features used for determining the preset condition at the root node are all the same.

In an embodiment, the internal node training module 606 may be configured to remove the preset classification condition features used to determine classification conditions at various nodes in the current path for the current path corresponding to the current node, to obtain residual preset classification condition features, then calculate a decision information entropy corresponding to the current node by using the number of training samples, in the classification subset corresponding to the current node, whose user identity attributes are legal users and illegal users, calculate a classification information entropy corresponding to each feature value of each residual preset classification condition feature in the classification subset corresponding to the current node and calculating an average information expectation accordingly, and calculate an information gain by subtracting the average information expectation from the decision information entropy corresponding to the current node, so as to determine the classification condition at the current node according to the residual preset classification condition feature having the maximum information gain.

In an embodiment, the internal node training module 606 may be configured to determine residual preset classification condition features corresponding to the current node except for the preset classification condition feature used for determining the classification condition at a node of a current path, count the number of training samples, in the classification subset corresponding to the current node, in which a user identity attribute corresponding to each feature value of each residual preset classification condition feature is a legal user, and determine the classification condition at the current node according to residual preset classification condition features corresponding to feature values having the maximum counted number corresponding to the current node.

Specifically, for the current path corresponding to the current node, the internal node training module 606 is configured to obtain residual preset classification condition features after the preset classification condition features used to determine the classification conditions at various nodes in the current path are removed. The internal node training module 606 is configured to: in the range of the classification subset corresponding to the current node, count the number of training samples in which a user attribute corresponding to each feature value of each residual preset classification condition feature is a legal user, and in this way, within the range of the classification subset corresponding to the current node, the residual preset classification condition feature corresponding to the feature values having the maximum counted number has a better performance of recognizing a legal user. The internal node training module 606 is configured to determine the classification condition at the current node according to the residual preset classification condition feature corresponding to the feature value having the maximum counted number, such that the classification condition at the current node can better recognize the legal user.

After the classification condition at the current node is determined, a child node of the current node needs to be further trained, and each child of the current node is trained respectively as a current node. The internal node training module 606 is configured to determine whether to end circulation, if for the training samples in the classification subset corresponding to the current node, the feature values corresponding to the same preset classification condition feature are respectively the same, it indicates that the training samples in the classification subset corresponding to the current node can no longer be further classified according to the preset classification condition feature, and the current node is a leaf node. Or, if the layer number of the current node reaches a designated layer number, internal nodes are not needed to be trained, and the current node is a leaf node. The layer number of the current node is equal to the number of nodes in the current path corresponding to the current node.

The leaf node training module 608 is configured to determine a user identity classification result at the current node according to a user identity attribute corresponding to the maximum number of training samples in the classification subset corresponding to the current node, and acquire a decision tree classifier.

If feature values corresponding to the same preset classification condition feature of training samples in the classification subset corresponding to the current node are respectively the same, or a layer number of the current node reaches a designated layer number, jump out of the circulation, and the leaf node training module 608 is configured to: when it is determined that the current node is a leaf node, count the number of training samples, in the classification subset corresponding to the current node, whose user identity attribute is a legal user, thereby calculating whether a proportion of the counted number in the total number of training samples in the classification subset corresponding to the current node exceeds 0.5. If yes, it is determined that a user identity classification result at the current node is a legal user or identity authentication is passed, and if no, it is determined that a user identity classification result at the current node is an illegal user or identity authentication is failed. Finally, a decision tree classifier including several determination paths formed by a root node, internal nodes and leaf nodes is obtained.

In the classifier training apparatus, training is performed layer by layer from a root node of a decision tree classifier till a leaf node by using training samples, a classification condition at each non-leaf node from the root node to the leaf node is determined according to one preset classification condition feature in the training samples, and the leaf node embodies a user identity classification result. In the decision tree classifier obtained through such training, a random determination path from the root node to the leaf node may embody coherence between multiple types of preset classification condition features, and the classification performance is good. When the decision tree classifier is used to perform identity authentication, not only correctness of each piece of evidence data submitted by a user is considered, coherence between multiple types of user evidence data may also be considered, and therefore, the accuracy of an identity authentication result is high.

Figure 7:
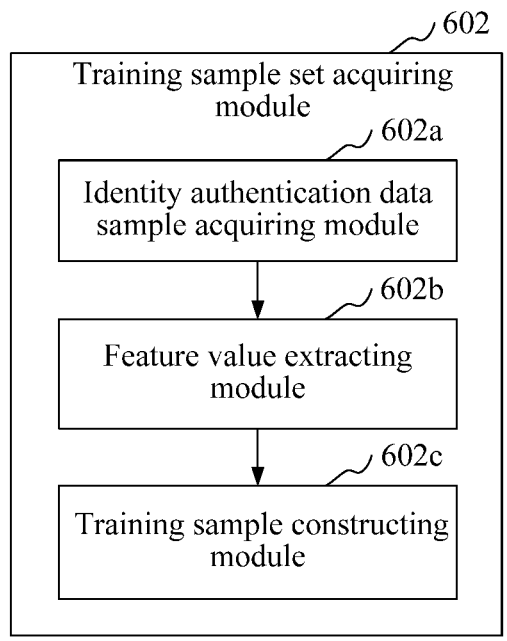
FIG. 7 is a structural block diagram of an embodiment of a training sample set acquiring module in the classifier training apparatus in FIG. 6.

As shown in FIG. 7, in an embodiment, the training sample set acquiring module 602 includes an identity authentication data sample acquiring module 602a, a feature value extracting module 602b, and a training sample constructing module 602c.

The identity authentication data sample acquiring module 602a is configured to acquire an identity authentication data sample for training a classifier, the identity authentication data sample comprising user evidence data as well as an evidence authentication result and an identity determination result that are determined through authentication.

The identity authentication data sample is a sample of identity authentication data undergone identity verification, and the identity authentication data refers to data for user identity authentication. The identity authentication data sample includes user evidence data, and the user evidence data is proof data provided by a user using a user terminal and used to indicate that the user is a legal user.

The identity authentication data sample further includes an evidence authentication result and an identity determination result determined through manual and/or automatic authentication. The evidence authentication result is an authentication result provided after performing authentication on the user evidence data in the identity authentication data sample, and indicates whether the user evidence data is correct or wrong. The identity determination result is a determination result that is determined in advance by identity authentication and indicates whether a user providing the user evidence data is a legal user or an illegal user.

The feature extracting module 602b is configured to extract a feature value corresponding to a preset classification condition feature according to the user evidence and the evidence authentication result.

For each identity authentication data sample, the feature extracting module 602b is configured to extract a feature value corresponding to a preset classification condition feature according to user evidence data and an evidence authentication result that are included in the identity authentication data sample. The type of the preset classification condition feature extracted here is related to the type of the user evidence data included in the identity authentication data sample of the user. One piece of user evidence data may be used to extract feature values corresponding to multiple preset classification condition features.

The training sample constructing module 602c is configured to construct a training sample in the training sample set according to an extracted feature corresponding to the identity authentication data sample and the identity determination result.

The training sample constructing module 602c is configured to: for each identity authentication data sample, extract a feature value corresponding to a preset classification condition feature, use the feature value extracted correspondingly for each identity authentication data sample as a feature value of each training sample, and use a corresponding identity determination result as a user identity attribute of each training sample, thereby obtaining a training sample set including several training samples.

In this embodiment, a feature value corresponding to a preset classification condition feature is extracted from user evidence data to construct a training sample, and because a decision tree classifier needs to determine classification at each non-leaf node, the training sample is more suitable than the identity authentication data sample for training to obtain a decision tree classifier; moreover, more detail information may be explored from the identity authentication data sample, such that a classification result of the decision tree classifier is more accurate.

Figure 8:
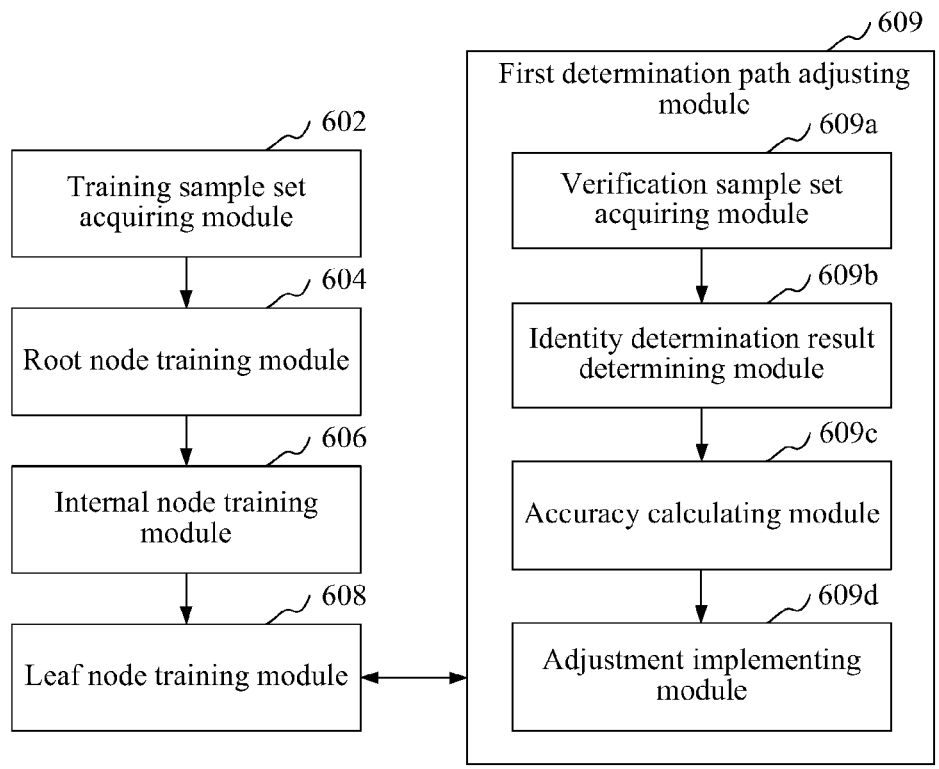
FIG. 8 is a structural block diagram of a classifier training apparatus in another embodiment.

As shown in FIG. 8, in an embodiment, the classifier training apparatus further includes a first determination path adjusting module 609, including a verification sample set acquiring module 609a, an identity determination result determining module 609b, an accuracy calculating module 609c and an adjustment implementing module 609d.

The verification sample set acquiring module 609a is configured to acquire a verification sample set, each verification sample in the verification sample set including a user identity attribute and a feature value corresponding to a preset classification condition feature.

The verification sample is used to verify a classification performance of the decision tree classifier, and the verification sample set acquiring module 609a is configured to prune the decision tree classifier when it is determined by the verification sample that the classification performance of the decision tree classifier is poor, where the pruning is a process of improving the classification accuracy of the decision tree by modifying a determination path of the decision tree. Each verification sample in the verification sample set has a form matching with the training sample in the training sample set, and includes a user identity attribute and a feature value corresponding to a preset classification condition feature. The preferred verification sample does not belong to the training sample set.

In an embodiment, the verification sample set acquiring module 609a is further configured to acquire an identity authentication data sample used to verify a decision tree classifier, including user evidence data as well as an evidence authentication result and an identity determination result determined through verification; extract the feature value corresponding to the preset classification condition feature according to the user evidence and the evidence authentication result; and construct the verification sample in the verification sample set according to the extracted feature value and the identity determination result corresponding to the identity authentication data sample used to verify the decision tree classifier.

The identity determination result determining module 609b is configured to determine and classify layer by layer from a classification condition at the root node of the decision tree classifier till a leaf node according to a feature value of each verification sample in the verification sample set, and determine an identity determination result corresponding to each of the verification samples according to a user identity classification result at the leaf node.

The process of verifying the decision tree is classifying a verification sample by using the decision tree under the premise of knowing a user identity attribute of the verification sample, so as to determine whether it is consistent with the known user identity attribute, if yes, it indicates that the classification is correct, and if not, it indicates that the classification is wrong, thereby achieving the objective of verifying the performance of the decision tree classifier.

Specifically, the identity determination result determining module 609b is configured to classify each verification sample according to a feature value of a corresponding preset classification feature of the verification sample, perform determination classification first according to a classification condition at a root node of the decision tree classifier to reach a child node of the root node, and perform determination classification on the verification sample according to the classification condition at the child node of the root node to reach a node at a layer 3, and so on. Till a leaf node is reached, if a determination path of which an identity classification result at the leaf node is a legal user is found, the identity determination result determining module 609b is configured to determine that an identity determination result of the verification sample is a legal user or the identity authentication is passed. If no determination path of which an identity classification result at the leaf node is a legal user can be found, the identity determination result determining module 609b is configured to determine that an identity determination result of the verification sample is an illegal user or the identity authentication is failed.

The accuracy calculating module 609c is configured to calculate the accuracy of each determination path of the decision tree classifier according to the identity determination result corresponding to the verification sample in the verification sample set and the user identity attribute.

Specifically, the accuracy calculating module 609c is configured to determine whether an identity determination result of each verification sample in the verification sample set matches with the user identity attribute of the verification sample, if they match with each other, record that the determination path used to determine the identity determination result of the verification sample has one correct determination; and if they do not match with each other, record that the determination path used to determine the identity determination result of the verification sample has one wrong determination, so as to accumulate records in this way. The accuracy calculating module 609c is configured to calculate and obtain the accuracy of the determination path by dividing a sum of correct determinations and wrong determinations of the determination path by the total number of correct determinations of the determination path, thereby calculating and obtaining the accuracy of each determination path.

The adjustment implementing module 609d is configured to adjust a node in a determination path whose accuracy is lower than a preset accuracy threshold.

The accuracy threshold is a quantified numeral value that is set in advance and used to determine whether a certain determination path of the decision tree classifier reaches classification performance standard. Specifically, the adjustment implementing module 609d is configured to: for a determination path whose accuracy is lower than a preset accuracy threshold, delete a leaf node thereof and use a parent node of the deleted leaf node as a new leaf node, so as to determine a user identity classification result at the new leaf node according to a user identity attribute corresponding to the maximum number of training samples in a new classification subset corresponding to the new leaf node, which is equivalent to combining the two determination paths. The adjustment implementing module 609d may also be configured to calculate the accuracy of the combined determination path again after the pruning, and adjust the determination path continuously if the accuracy is lower than the preset accuracy threshold. In other embodiments, the adjustment implementing module 609d may be further configured to combine multiple determination paths which have accuracies lower than the preset accuracy threshold and whose leaf nodes are adjacent to each other, to achieve the objective of adjusting the node, in the determination path, whose accuracy is lower than the preset accuracy threshold.

In this embodiment, the classification performance of the decision tree classifier is verified by using the verification sample, so as to perform correction when the classification performance of a certain determination path of the decision tree classifier is low, thereby improving the classification accuracy of the whole decision tree classifier.

Figure 9:
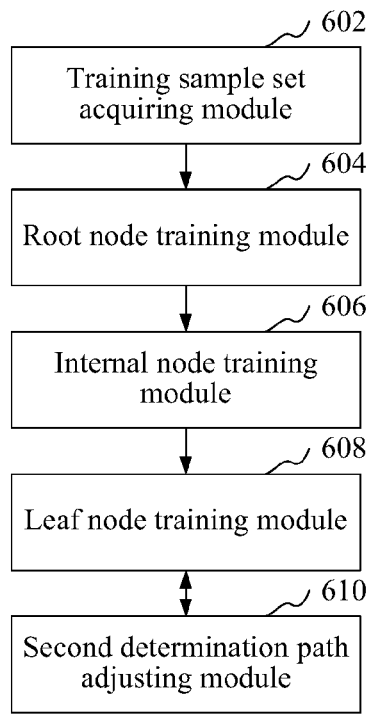
FIG. 9 is a structural block diagram of a classifier training apparatus in still another embodiment.

As shown in FIG. 9, in an embodiment, the classifier training apparatus further includes: a second determination path adjusting module 610, configured to acquire user feedback information, and adjust, according to the feedback information, a node in a determination path related to the feedback information in the decision tree classifier.

Specifically, the second determination path adjusting module 610 may be configured to delete a leaf node of the determination path, and use a parent node of the deleted leaf node as a new leaf node, so as to determine a user identity classification result at the new leaf node according to a user identity attribute corresponding to the training samples having the maximum number in a new classification subset corresponding to the new leaf node.

Figure 10:
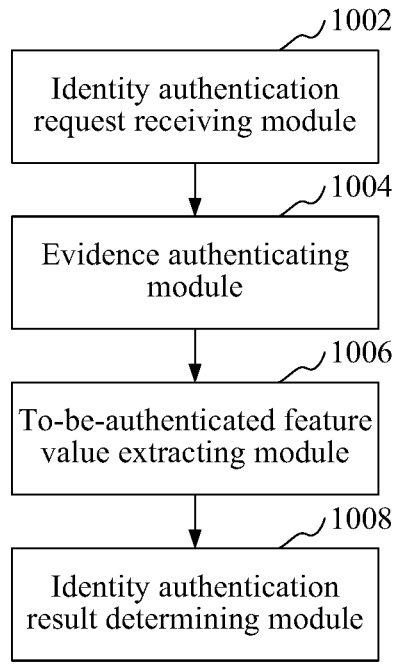
FIG. 10 is a structural block diagram of an identity authentication system in an embodiment.

As shown in FIG. 10, in an embodiment, an identity authentication system is provided, and the system includes an identity authentication request receiving module 1002, an evidence authenticating module 1004, a to-be-authenticated feature value extracting module 1006, and an identity authentication result determining module 1008.

The identity authentication request receiving module 1002 is configured to receive an identity authentication request sent by a user terminal and carrying a to-be-authenticated user identification and to-be-authenticated user evidence data.

After a real user losses a login password corresponding to a user identification for uniquely identity an identity thereof, the user may provide to-be-authenticated user identification on a user terminal by using an appeal page provided by a user identification manager, and provide, independently or under the guide of the appeal page, to-be-authenticated user evidence data used to prove that the user is a real owner of the to-be-authenticated user identification thereof. Therefore, the user terminal sends the identity authentication request carrying the to-be-authenticated user identification and the to-be-authenticated user evidence data, and the identity authentication request receiving module 1002 is configured to receive the identity authentication request and performs identity authentication accordingly. The user identification may be an account, for example, an account for logging in to an instant messaging client.

The evidence authenticating module 1004 is configured to acquire user data corresponding to the to-be-authenticated user identification, and perform authentication on the to-be-authenticated user evidence data according to the acquired user data to obtain an evidence authentication result.

User data, such as historical password data, a user name used to be used, and the evidence authenticating module 1004 is configured to: when implementing the identity authentication, use the to-be-authenticated user identification to acquire corresponding user data, so as to verify the to-be-authenticated user evidence data carried in the identity authentication request, thereby obtaining an evidence authentication result used to indicate whether the to-be-authenticated user evidence data is correct or wrong.

The to-be-authenticated feature value extracting module 1006 is configured to extract a to-be-authenticated feature value corresponding to a preset classification condition feature according to the to-be-authenticated user evidence data and the obtained evidence authentication result.

The to-be-authenticated feature value extracting module 1006 is configured to extract a corresponding to-be-authenticated feature value corresponding to a preset classification condition feature according to the to-be-authenticated user evidence data and the corresponding evidence authentication result. Here, the type of the extracted preset classification condition feature is related to the type of the to-be-authenticated user evidence data. One piece of to-be-authenticated user evidence data may be used to extract to-be-authenticated feature values corresponding to multiple preset classification condition features.

The identity authentication result determining module 1008 is configured to determine and classify layer by layer from a classification condition at a root node of a decision tree classifier till a leaf node according to the to-be-authenticated feature value corresponding to the preset classification condition feature, and determine an identity authentication result corresponding to the to-be-authenticated user identification according to a user identity classification result at the leaf node.

Specifically, the identity authentication result determining module 1008 is configured to: according to a to-be-authenticated feature value corresponding to a preset classification condition feature, perform determination classification first according to a classification condition at a root node of the decision tree classifier to reach a child node of the root node, and perform determination classification according to the classification condition at the child node of the root node to reach a node at a layer 3, and so on. Till a leaf node is reached, if a determination path of which an identity classification result at the leaf node is a legal user is found, the identity authentication result determining module 1008 is configured to determine that an identity authentication result of the identity authentication is a legal user or the identity authentication is passed. If no determination path of which an identity classification result at the leaf node is a legal user can be found, the identity authentication result determining module 1008 is configured to determine that an identity authentication result of the identity authentication is an illegal user or the identity authentication is failed.

Figure 11:
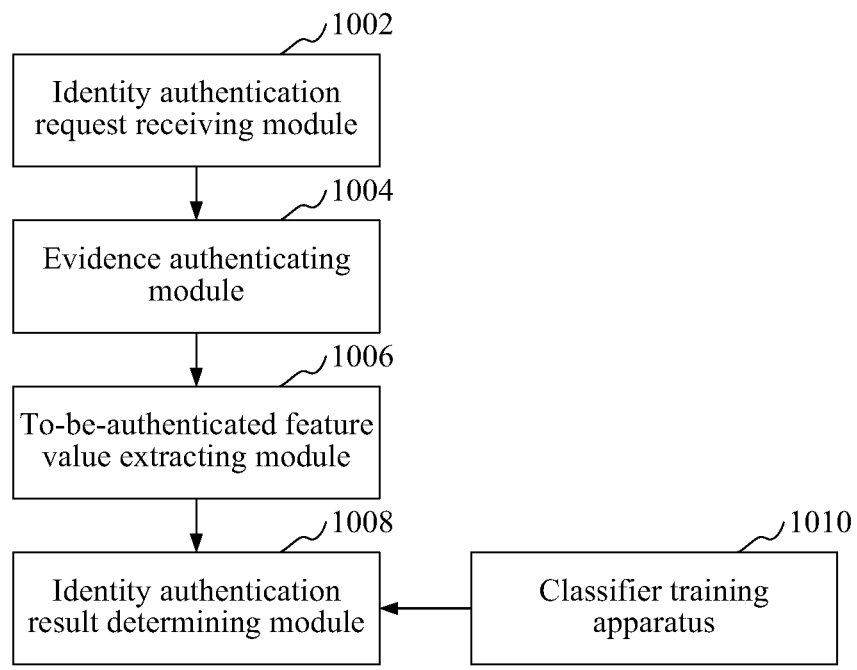
FIG. 11 is a structural block diagram of an identity authentication system in another embodiment.

As shown in FIG. 11, in an embodiment, the identity authentication system further includes a classifier training apparatus 1010, and the classifier training apparatus 1010 includes the modules included in a classifier training apparatus according to any of the foregoing embodiments.

As disclosed, the disclosed methods can be implemented by an apparatus/device including one or more processor, and a non-transitory computer-readable storage medium having instructions stored thereon. The instructions can be executed by the one or more processors of the apparatus/device to implement the methods disclosed herein. In some cases, the instructions can include one or more units corresponding to the disclosed methods.

Figure 12:
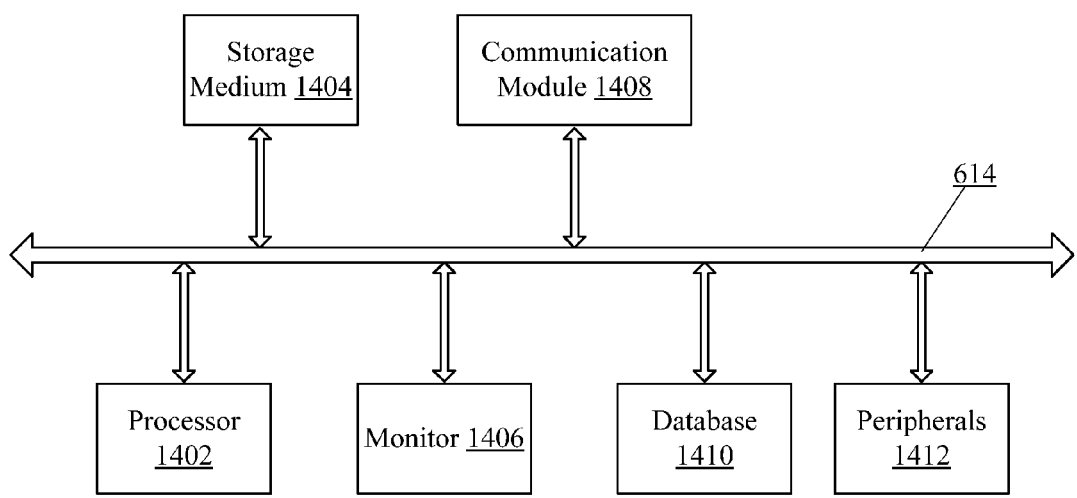
FIG. 12 illustrates an exemplary computing device consistent with the disclosed embodiments.

For example, the disclosed server and/or client may include a computing device capable of implementing the disclosed methods. As shown in FIG. 12, the exemplary computing device 1400 may include a processor 1402, a storage medium 1404, a monitor 1406, a communication module 1408, a database 1410, peripherals 1412, and one or more bus 1414 to couple the devices together. Certain devices may be omitted and other devices may be included.

Processor 1402 may include any appropriate processor or processors. Further, processor 1402 may include multiple cores for multi-thread or parallel processing. The processor 1402 may be used to run computer program(s) stored in the storage medium 1404. Storage medium 1404 may include memory modules, such as ROM, RAM, and flash memory modules, and mass storages, such as CD-ROM, U-disk, removable hard disk, etc. Storage medium 1404 may store computer programs for implementing various disclosed processes, when executed by processor 1402. In one embodiment, storage medium 1404 may be a non-transient computer-readable storage medium having a computer program stored thereon, when being executed, to cause the computer to implement the disclosed methods.

Further, peripherals 1412 may include I/O devices such as keyboard and mouse, and communication module 1408 may include network devices for establishing connections, e.g., through a communication network such as the Internet. Database 1410 may include one or more databases for storing certain data and for performing certain operations on the stored data, such as webpage browsing, database searching, etc.

A person of ordinary skill in the art may understand that all or some of the processes for implementing the foregoing method embodiments may be implemented by a computer program instructing relevant hardware. The program may be stored in a computer readable storage medium. When the program is executed, the program may include the processes of the embodiments of the foregoing methods. The storage medium may be a magnetic disk, an optical disc, a Read-Only Memory (ROM), a Random Access Memory (RAM), or the like.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

The invention claimed is:

1. A classifier training method, comprising:
acquiring, by a processor of an identity authentication server, a training sample set, each training sample in the training sample set comprising a user identity attribute and a feature value corresponding to a preset classification condition feature;
determining, by the processor of the identity authentication server, a classification condition at a root node according to one preset classification condition feature, performing classification on the training samples in the training sample set according to the classification condition at the root node, and acquiring a classification subset corresponding to a child node of the root node; and using the child node of the root node as a current node;
determining, by the processor of the identity authentication server, a classification condition at the current node according to another preset classification condition feature, performing classification on training samples in a classification subset corresponding to the current node according to the classification condition at the current node, and acquiring a classification subset of a child node of the current node;
using, by the processor of the identity authentication server, the child node of the current node as a current node, continuously performing the step of determining a classification condition at the current node according to another preset classification condition feature, performing classification on training samples in a classification subset corresponding to the current node according to the classification condition at the current node, and acquiring a classification subset of a child node of the current node, until feature values corresponding to the same preset classification condition feature of training samples in the classification subset corresponding to the current node are respectively the same, or a layer number of the current node reaches a designated layer number; and determining, by the processor of the identity authentication server, a user identity classification result at the current node according to a user identity attribute corresponding to the maximum number of training samples in the classification subset corresponding to the current node, and acquiring a decision tree classifier;

wherein the determining a classification condition at a root node according to one preset classification condition feature comprises:

counting the number of training samples, in the training sample set, in which a user identity attribute corresponding to each feature value of each preset classification condition feature is a legal user, and determining the classification condition at the root node according to corresponding preset classification condition features corresponding to feature values having the maximum counted number in the training sample set; and the determining a classification condition at the current node according to another preset classification condition feature comprises:

determining residual preset classification condition features corresponding to the current node except for the preset classification condition feature used for determining the classification condition at a node of a current path, counting the number of training samples, in the classification subset corresponding to the current node, in which a user identity attribute corresponding to each feature value of each residual preset classification condition feature is a legal user, and determining the classification condition at the current node according to residual preset classification condition features corresponding to feature values having the maximum counted number corresponding to the current node.

2. The method of claim 1, wherein the acquiring a training sample set comprises:

acquiring an identity authentication data sample for training a classifier, the identity authentication data sample comprising user evidence data as well as an evidence authentication result and an identity determination result that are determined through authentication;

extracting a feature value corresponding to a preset classification condition feature according to the user evidence and the evidence authentication result; and constructing a training sample in the training sample set according to an extracted feature corresponding to the identity authentication data sample and the identity determination result.

3. The method of claim 1, further comprising:

acquiring a verification sample set, each verification sample in the verification sample set comprising a user identity attribute and a feature value corresponding to a preset classification condition feature;

determining and classifying layer by layer from a classification condition at the root node of the decision tree classifier till a leaf node according to a feature value of each verification sample in the verification sample set, and determining an identity determination result corresponding to each of the verification samples according to a user identity classification result at the leaf node;

calculating accuracy of each determination path of the decision tree classifier according to the identity determination result and the user identity attribute corresponding to the verification sample in the verification sample set; and adjusting a node in a determination path whose accuracy is lower than a preset accuracy threshold.

4. The method according to claim 1, further comprising: acquiring user feedback information, and adjusting, according to the feedback information, a node in a determination path related to the feedback information in the decision tree classifier.

5. An identity authentication method, comprising:

receiving, by a processor of an identity authentication server, an identity authentication request sent by a user terminal and carrying a to-be-authenticated user identification and to-be-authenticated user evidence data;

acquiring, by the processor of the identity authentication server, user data corresponding to the to-be-authenticated user identification, and performing authentication on the to-be-authenticated user evidence data according to the acquired user data to obtain an evidence authentication result;

extracting, by the processor of the identity authentication server, a to-be-authenticated feature value corresponding to a preset classification condition feature according to the to-be-authenticated user evidence data and the obtained evidence authentication result; and determining, by the processor of the identity authentication server, and classifying layer by layer from a classification condition at a root node of a decision tree classifier till a leaf node according to the to-be-authenticated feature value corresponding to the preset classification condition feature, and determining an identity authentication result corresponding to the to-be-authenticated user identification according to a user identity classification result at the leaf node;

wherein the decision tree classifier is obtained by training using the classifier training method of:

acquiring a training sample set, each training sample in the training sample set comprising a user identity attribute and a feature value corresponding to a preset classification condition feature;

determining a classification condition at a root node according to one preset classification condition feature, performing classification on the training samples in the training sample set according to the classification condition at the root node, and acquiring a classification subset corresponding to a child node of the root node; and using the child node of the root node as a current node;

determining a classification condition at the current node according to another preset classification condition feature, performing classification on training samples in a classification subset corresponding to the current node according to the classification condition at the current node, and acquiring a classification subset of a child node of the current node;

using the child node of the current node as a current node, continuously performing the step of determining a classification condition at the current node according to another preset classification condition feature, performing classification on training samples in a classification subset corresponding to the current node according to the classification condition at the current node, and acquiring a classification subset of a child node of the current node, until feature values corresponding to the same preset classification condition feature of training samples in the classification subset corresponding to the current node are respectively the same, or a layer number of the current node reaches a designated layer number; and determining a user identity classification result at the current node according to a user identity attribute corresponding to the maximum number of training samples in the classification subset corresponding to the current node, and acquiring a decision tree classifier;

wherein the determining a classification condition at a root node according to one preset classification condition feature comprises:

counting the number of training samples, in the training sample set, in which a user identity attribute corresponding to each feature value of each preset classification condition feature is a legal user, and determining the classification condition at the root node according to corresponding preset classification condition features corresponding to feature values having the maximum counted number in the training sample set; and the determining a classification condition at the current node according to another preset classification condition feature comprises:

determining residual preset classification condition features corresponding to the current node except for the preset classification condition feature used for determining the classification condition at a node of a current path, counting the number of training samples, in the classification subset corresponding to the current node, in which a user identity attribute corresponding to each feature value of each residual preset classification condition feature is a legal user, and determining the classification condition at the current node according to residual preset classification condition features corresponding to feature values having the maximum counted number corresponding to the current node.

6. The method of claim 5, wherein the acquiring a training sample set comprises:

acquiring an identity authentication data sample for training a classifier, the identity authentication data sample comprising user evidence data as well as an evidence authentication result and an identity determination result that are determined through authentication;

extracting a feature value corresponding to a preset classification condition feature according to the user evidence and the evidence authentication result; and constructing a training sample in the training sample set according to an extracted feature corresponding to the identity authentication data sample and the identity determination result.

7. The method of claim 5, further comprising:

acquiring a verification sample set, each verification sample in the verification sample set comprising a user identity attribute and a feature value corresponding to a preset classification condition feature;

determining and classifying layer by layer from a classification condition at the root node of the decision tree classifier till a leaf node according to a feature value of each verification sample in the verification sample set, and determining an identity determination result corresponding to each of the verification samples according to a user identity classification result at the leaf node;

calculating accuracy of each determination path of the decision tree classifier according to the identity determination result and the user identity attribute corresponding to the verification sample in the verification sample set; and adjusting a node in a determination path whose accuracy is lower than a preset accuracy threshold.

8. The method according to claim 5, further comprising: acquiring user feedback information, and adjusting, according to the feedback information, a node in a determination path related to the feedback information in the decision tree classifier.

9. A classifier training apparatus, comprising a processor and a non-transitory storage, wherein the non-transitory storage is configured to store one or more instructions to be executed by the processor, and the one or more instructions comprise:

a training sample set acquiring instruction, a root node training instruction, an internal node training instruction, and a leaf node training instruction;

the processor is configured to read the training sample set acquiring instruction to perform a process of acquiring a training sample set, each training sample in the training sample set comprising a user identity attribute and a feature value corresponding to a preset classification condition feature;

the processor is configured to read the root node training instruction to perform a process of determining a classification condition at a root node according to one preset classification condition feature, performing classification on the training samples in the training sample set according to the classification condition at the root node, and acquiring a classification subset corresponding to a child node of the root node; and using the child node of the root node as a current node;

the processor is configured to read the internal node training instruction to perform a process of determining a classification condition at the current node according to another preset classification condition feature, performing classification on training samples in a classification subset corresponding to the current node according to the classification condition at the current node, and acquiring a classification subset of a child node of the current node; and further perform a process of using the child node of the current node as a current node, and continuously performing the step of determining a classification condition at the current node according to another preset classification condition feature, performing classification on training samples in a classification subset corresponding to the current node according to the classification condition at the current node, and acquiring a classification subset of a child node of the current node, until feature values corresponding to the same preset classification condition feature of training samples in the classification subset corresponding to the current node are respectively the same, or a layer number of the current node reaches a designated layer number; and the processor is configured to read the leaf node training instruction to perform a process of determining a user identity classification result at the current node according to a user identity attribute corresponding to the maximum number of training samples in the classification subset corresponding to the current node, and acquiring a decision tree classifier;

wherein the processor is configured to read the root node training instruction to further perform a process of counting the number of training samples, in the training sample set, in which a user identity attribute corresponding to each feature value of each preset classification condition feature is a legal user, and determining the classification condition at the root node according to corresponding preset classification condition features corresponding to feature values having the maximum counted number in the training sample set; and the processor is configured to read the internal node training instruction to further perform a process of determining residual preset classification condition features corresponding to the current node except for the preset classification condition feature used for determining the classification condition at a node of a current path, counting the number of training samples, in the classification subset corresponding to the current node, in which a user identity attribute corresponding to each feature value of each residual preset classification condition feature is a legal user, and determining the classification condition at the current node according to residual preset classification condition features corresponding to feature values having the maximum counted number corresponding to the current node.

10. The apparatus according to claim 9, wherein the training sample set acquiring instruction comprises:

an identity authentication data sample acquiring instruction, a feature extracting instruction and a training sample constructing instruction;

the processor is configured to read the identity authentication data sample acquiring instruction to perform a process of acquiring an identity authentication data sample for training a classifier, the identity authentication data sample comprising user evidence data as well as an evidence authentication result and an identity determination result that are determined through authentication;

the processor is configured to read the feature extracting instruction to perform a process of extracting a feature value corresponding to a preset classification condition feature according to the user evidence and the evidence authentication result; and the processor is configured to read the training sample constructing instruction to perform a process of constructing a training sample in the training sample set according to an extracted feature corresponding to the identity authentication data sample and the identity determination result.

11. The apparatus according to claim 9, wherein the one or more instructions further comprises a first determination path adjusting instruction, comprising:

a verification sample set acquiring instruction, an identity determination result determining instruction, an accuracy calculating instruction and an adjustment implementing instruction;

the processor is configured to read the verification sample set acquiring instruction to perform a process of acquiring a verification sample set, each verification sample in the verification sample set comprising a user identity attribute and a feature value corresponding to a preset classification condition feature;

the processor is configured to read the identity determination result determining instruction to perform a process of determining and classifying layer by layer from a classification condition at the root node of the decision tree classifier till a leaf node according to a feature value of each verification sample in the verification sample set, and determining an identity determination result corresponding to each of the verification samples according to a user identity classification result at the leaf node;

the processor is configured to read the accuracy calculating instruction to perform a process of calculating the accuracy of each determination path of the decision tree classifier according to the identity determination result and the user identity attribute corresponding to the verification sample in the verification sample set; and the processor is configured to read the adjustment implementing instruction to perform a process of adjusting a node in a determination path whose accuracy is lower than a preset accuracy threshold.

12. The apparatus according to claim 9, wherein the one or more instructions further comprises: a second determination path adjusting instruction, and the processor is configured to read the second determination path adjusting instruction to perform a process of acquiring user feedback information, and adjusting, according to the feedback information, a node in a determination path related to the feedback information in the decision tree classifier.

* * * * *